(12) United States Patent
Saitou et al.

(10) Patent No.: US 8,211,953 B2
(45) Date of Patent: *Jul. 3, 2012

(54) POLYOLEFIN RESIN FOAM AND PROCESS FOR PRODUCTION THEREOF

(75) Inventors: Makoto Saitou, Ibaraki (JP); Yasuyuki Tokunaga, Ibaraki (JP); Takio Itou, Ibaraki (JP); Hiroki Fujii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 484 days.

This patent is subject to a terminal disclaimer.

(21) Appl. No.: 12/443,999

(22) PCT Filed: Sep. 27, 2007

(86) PCT No.: PCT/JP2007/068886
§ 371 (c)(1),
(2), (4) Date: Apr. 2, 2009

(87) PCT Pub. No.: WO2008/041617
PCT Pub. Date: Apr. 10, 2008

(65) Prior Publication Data
US 2010/0016458 A1 Jan. 21, 2010

(30) Foreign Application Priority Data

Oct. 2, 2006 (JP) .................. 2006-270319

(51) Int. Cl.
*B01J 13/00* (2006.01)
*C08J 3/05* (2006.01)
*C08J 9/00* (2006.01)
*C08J 9/08* (2006.01)

(52) U.S. Cl. .............. 521/139; 516/98; 516/99; 521/50; 521/134

(58) Field of Classification Search .................. 521/139, 521/50, 134; 516/98, 99
See application file for complete search history.

(56) References Cited

U.S. PATENT DOCUMENTS

| 2005/0053779 A1 | 3/2005 | Saitou et al. | |
| 2006/0155073 A1 | 7/2006 | Oobayashi et al. | |
| 2006/0182958 A1* | 8/2006 | Okochi et al. | 428/355 AC |
| 2006/0194892 A1 | 8/2006 | Ramesh et al. | |
| 2009/0209670 A1* | 8/2009 | Kanae et al. | 521/97 |

FOREIGN PATENT DOCUMENTS

| CN | 1618918 A | 5/2005 |
| CN | 1803914 A | 7/2006 |
| EP | 1 508 588 A1 | 2/2005 |
| EP | 1 690 907 A2 | 8/2006 |
| JP | 8-059876 A | 3/1996 |
| JP | 10-316789 A | 12/1998 |
| JP | 2004-018595 A | 1/2004 |
| JP | 2004-250529 A | 9/2004 |
| JP | 2005-097566 A | 4/2005 |
| JP | 2006-249404 A | 9/2006 |
| JP | 2006249409 A | 9/2006 |
| JP | 2007-269942 A | 10/2007 |
| KR | 10-2005-0020695 A | 3/2005 |
| TW | 200513489 A | 4/2005 |

OTHER PUBLICATIONS

International Search Report for PCT/JP2007/068886.*
Supplementary European Search Report dated Feb. 18, 2011, in Application No. 07828632.5.
Communication issued Jun. 3, 2011, in corresponding Korean Application No. 10-2009-7006695.
Office Action issued Dec. 9, 2010, in counterpart Chinese Application No. 200780036882.5.
Office Action issued by the European Patent Office on Sep. 13, 2011 in the corresponding European Patent Application No. 07828632.5.
Office Action dated Nov. 15, 2011, issued by the State Intellectual Property Office of the People's Republic of China in corresponding Chinese Patent Application No. 200780036882.5.
Taiwanese Office Action, dated Apr. 17, 2012, issued by the Taiwanese Intellectual Property Office in corresponding ROC (Taiwan) Application No. 096136887.
Communication dated May 1, 2012 from the Japanese Patent Office in counterpart Japanese application No. 2006-270319.

* cited by examiner

*Primary Examiner* — Timothy J. Kugel
(74) *Attorney, Agent, or Firm* — Sughrue Mion, PLLC

(57) ABSTRACT

The present invention relates to a polyolefin resin foam which includes a polyolefin resin composition includes: (A) a rubber and/or a thermoplastic elastomer; (B) a polyolefin resin; and (C) at least one aliphatic compound selected from an aliphatic acid, an aliphatic acid amide and an aliphatic acid metallic soap, the compound having a polar functional group and having a melting point of 50 to 150° C., in which a content of the aliphatic compound is 1 to 5 parts by weight based on 100 parts by weight of the total amount of the rubber and/or thermoplastic elastomer and the polyolefin resin. The polyolefin resin foam of the invention is excellent in flexibility and cushioning properties, and has good processability, especially excellent cutting processability.

10 Claims, 1 Drawing Sheet

POLYOLEFIN RESIN FOAM AND PROCESS FOR PRODUCTION THEREOF

TECHNICAL FIELD

The present invention relates to a polyolefin resin foam which is excellent in flexibility, cushioning properties and processability, and a process for producing the same.

BACKGROUND ART

Foams (foamed molded articles) have been used as internal insulators of electronic devices and information devices, cushioning materials, dust proofing materials, sound insulating materials, heat insulating materials, food packing materials, clothing materials, building materials, interior parts or exterior parts of automobiles and home electric appliances, and the like. Such foams are required to have characteristics such as flexibility, cushioning properties and heat insulating properties, from the viewpoint of securing sealing properties thereof when incorporated as parts. As materials for the foams, resin foams based on polyolefins such as polyethylene and polypropylene have been known. However, these foams have a problem of being insufficient in terms of flexibility and cushioning properties. As an attempt for solving such a problem, it has been conducted to soften the material itself by raising expansion ratio or by incorporating a rubber ingredient or the like into a polyolefin resin. However, ordinary polyethylene or polypropylene is weak in tension at high temperature, namely, in melt tension, and even when it is attempted to obtain high expansion ratio, cell walls collapse at the time of foaming, thereby causing gas escape and cell linking. It has therefore been difficult to obtain a soft foam having the desired high expansion ratio.

In order to solve the above-mentioned problems, JP-A-2004-250529 discloses a polyolefin resin foam produced by foam-molding a composition for the polyolefin resin foam having a melt tension of 20 cN or more, which contains a polymer component composed of a polyolefin resin and a rubber and/or a thermoplastic olefin elastomer, and powdery particles. However, there has been still room for improvement in terms of flexibility, cushioning properties, cutting processability and the like of the obtained foam.

Further, accompanied with recent progress of miniaturization of electronic devices and information devices, foams used as internal insulators or cushioning materials have also come to be required to be small in width and thickness. However, in the foam containing the conventional polyolefin resin material, strain on compression is large, especially when the processing width is narrow. For example, at the time of punching processing, cells in a punching site collapse to become difficult to recover the shape of the foam, thereby causing a problem that an upper end portion of the punching site becomes roundish or that the thickness of the punching site (end portion) becomes thin.

DISCLOSURE OF THE INVENTION

An object of the invention is to provide a polyolefin resin foam which is excellent in flexibility and cushioning properties, and has good processability, especially excellent cutting processability; and a process for producing the same.

As a result of the intensive studies for achieving the above-mentioned object, the present inventors have found that a foam which has excellent flexibility and cushioning properties and in which cells in a punching site are difficult to collapse at the time of punching processing to provide excellent shape recovery at the time of processing is obtained by foaming a polyolefin resin composition containing a rubber and/or a thermoplastic elastomer, a polyolefin resin and a specified aliphatic compound, thereby completing the invention.

Namely, the invention relates to the following (1) to (10):

(1) A polyolefin resin foam which includes a polyolefin resin composition including:

(A) a rubber and/or a thermoplastic elastomer;
(B) a polyolefin resin; and
(C) at least one aliphatic compound selected from an aliphatic acid, an aliphatic acid amide and an aliphatic acid metallic soap, the compound having a polar functional group and having a melting point of 50 to 150° C., in which a content of the aliphatic compound is 1 to 5 parts by weight based on 100 parts by weight of the total amount of the rubber and/or thermoplastic elastomer and the polyolefin resin.

(2) The polyolefin resin foam according to (1), in which the aliphatic compound is an aliphatic acid or an aliphatic acid amide.

(3) The polyolefin resin foam according to (2), in which the aliphatic acid amide is erucamide.

(4) The polyolefin resin foam according to (2), in which the aliphatic acid is behenic acid.

(5) The polyolefin resin foam according to any one of (1) to (4), in which the polyolefin resin has a melt tension of 3.0 cN or more at a temperature of 210° C. and at a take-up speed of 2.0 m/min.

(6) The polyolefin resin foam according to any one of (1) to (5), in which the rubber and/or thermoplastic elastomer is/are a non-crosslinked type thermoplastic olefin elastomer.

(7) The polyolefin resin foam according to any one of (1) to (6), having an average cell diameter of 50 to 250 μm.

(8) The polyolefin resin foam according to any one of (1) to (7), which is obtained by foaming the polyolefin resin composition further including a nucleant agent having an average particle diameter of 0.1 μm to less than 2.0 μm, using carbon dioxide in a supercritical state.

(9) The polyolefin resin foam according to any one of (1) to (8), having a density of 0.2 g/cm$^3$ or less.

(10) A process for producing a polyolefin resin foam, the process including foaming a polyolefin resin composition using carbon dioxide in a supercritical state, in which the polyolefin resin composition including:

(A) a rubber and/or a thermoplastic elastomer;
(B) a polyolefin resin;
(C) at least one aliphatic compound selected from an aliphatic acid, an aliphatic acid amide and an aliphatic acid metallic soap, the compound having a polar functional group and having a melting point of 50 to 150° C., and
(D) a nucleant agent having an average particle diameter of 0.1 μm to less than 2.0 μm, in which a content of the aliphatic compound is 1 to 5 parts by weight based on 100 parts by weight of the total amount of the rubber and/or thermoplastic elastomer and the polyolefin resin.

The polyolefin resin foam of the invention is excellent in flexibility and cushioning properties, and also excellent in processability. In particular, even when the expansion ratio is high, the cells in the punching site are difficult to collapse at the time of punching processing to have excellent shape recovery. For this reason, the processing width can be extremely narrowed, and it becomes possible to widen the range of selection of the thickness.

BEST MODE FOR CARRYING OUT THE INVENTION

Figure 1:
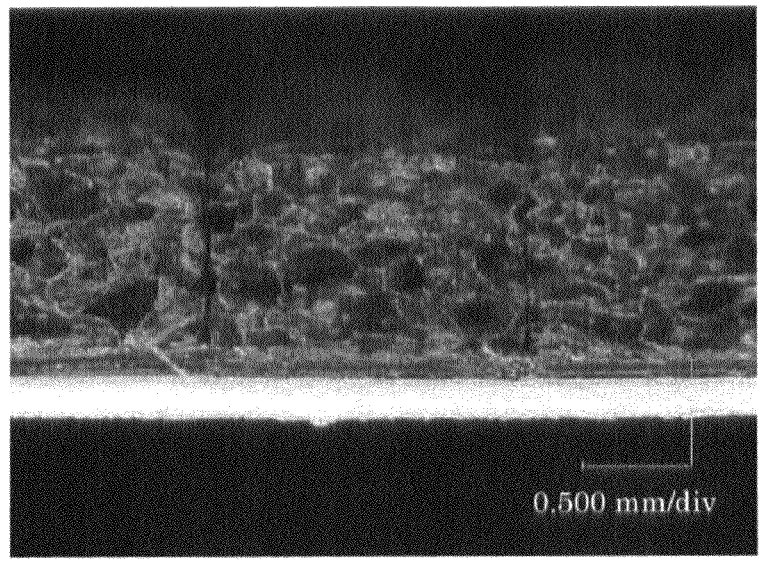
FIG. 1 is a digital microscopic photograph showing a state of a foam after punching in the case where evaluation is "A" in an evaluation test of cutting processability in Examples.

The polyolefin resin foam of the invention comprises a polyolefin resin composition including (A) a rubber and/or a thermoplastic elastomer (hereinafter also referred to as component (A)), (B) a polyolefin resin (hereinafter also referred to as component (B)), and (C) at least one aliphatic compound selected from an aliphatic acid, an aliphatic acid amide and an aliphatic acid metallic soap, which has a polar functional group and a melting point of 50 to 150° C. (hereinafter also referred to as component (C)). It is preferred that the polyolefin resin foam of the invention contains (D) a nucleant agent (hereinafter also referred to as component (D)) or a flame retardant, in addition to the above-mentioned components (A) to (C). Further, there may be contained various additives, for example, a blowing agent, a lubricant, an antioxidant, a thermal stabilizer, a light resisting agent such as HALS, a weathering agent, a metal inactivator, a UV absorber, a light stabilizer, a stabilizer such as a copper-induced degradation inhibiting agent, a filler, a reinforcing agent, an antistatic agent, an antibacterial agent, an antifungal agent, a dispersant, a plasticizer, a flame retardant, a tackifier, carbon black, a colorant such as an organic pigment, an isobutylene-isoprene copolymer, a rubber such as a silicone rubber, an ethylene-vinyl acetate copolymer, a thermoplastic resin such as an ABS resin, and the like, within the range not impairing the effects of the invention.

Component (A): Rubber and/or Thermoplastic Elastomer

As component (A) of the invention, a well-known, commonly used rubber and/or thermoplastic elastomer can be used without any particular limitation as long as it is foamable. Examples of the rubbers include natural or synthetic rubbers such as natural rubber, polyisobutylene, isoprene rubber, chloroprene rubber, butyl rubber and nitrile butyl rubber. Examples of the thermoplastic elastomers include, for example, olefin elastomers such as an ethylene-propylene copolymer, an ethylene-propylene-diene copolymer, an ethylene-vinyl acetate copolymer, polybutene, polyisobutylene and chlorinated polyethylene; styrenic elastomers such as a styrene-butadiene-styrene copolymer, a styrene-isoprene-styrene copolymer, a styrene-isoprene-butadiene-styrene copolymer and hydrogenated polymers thereof; thermoplastic polyester-based elastomers; thermoplastic polyurethane-based elastomers; thermoplastic acrylic elastomers; and the like. These rubbers and thermoplastic polymers can be used either alone or as a mixture of two or more thereof.

Of these, olefin elastomers are preferred as component (A) of the invention, and a thermoplastic olefin elastomer is particularly preferred. The thermoplastic olefin elastomer is an elastomer having a structure in which an olefin component and an olefin rubber component are micro-phase separated, and excellent in compatibility with the polyolefin resin as component (B). More specifically, a polypropylene resin (PP), ethylene-propylene rubber (EPM) or ethylene-propylene-diene rubber (EPDM) is preferably exemplified as the thermoplastic olefin elastomer. The mass ratio of the above-mentioned olefin component and olefin rubber component (olefin component/olefin rubber) is preferably 90/10 to 10/90, and more preferably 80/20 to 20/80, from the viewpoint of compatibility.

Although not particularly limited, component (A) of the invention is preferably a non-crosslinked type thermoplastic olefin resin, from the viewpoint of cost. In the invention, excellent shape processability at the time of punching processing can be exhibited by an action of component (C) without using a dynamically crosslinked type thermoplastic elastomer. Incidentally, the dynamically crosslinked type thermoplastic elastomer is one in which a rubber component has a crosslinked structure by a crosslinking agent, and has a characteristic phase structure (morphology) of a sea-island structure taking a thermoplastic resin as a sea (matrix) and particles of the crosslinked rubber component as islands (domains). The non-crosslinked type thermoplastic elastomer means a mere polymer blend using no crosslinking agent.

Softener

It is preferred that a softener is further contained in comp0onent (A) of the invention. Processability and flexibility can be improved by allowing the softener to be contained. As the softener, there can be suitably used a softener generally used in a rubber product.

Specific examples of the softeners include petroleum oil materials such as process oil, lubricating oil, paraffin oil, liquid paraffin oil, petroleum asphalt and vaseline; coal tars such as coal tar and coal tar pitch; aliphatic oils such as castor oil, linseed oil, rapeseed oil, soybean oil and copra oil; waxes such as toll oil, bees wax, carnauba wax and lanolin; synthetic polymer substances such as a petroleum resin, a coumaron-eindene resin and atactic polypropylene; ester compounds such as dioctyl phthalate, dioctyl adipate and dioctyl sebacate; microcrystalline wax, sub(factice), liquid polybutadiene, modified liquid polybutadiene, liquid thiokol, liquid polyisoprene, liquid polybutene and liquid ethylene-$\alpha$-olefin copolymer. Of these, paraffin, naphthene, aromatic mineral oils, liquid polyisoprene, liquid polybutene and liquid ethylene-$\alpha$-olefin copolymer are preferred, and liquid polyisoprene, liquid polybutene and liquid $\alpha$-olefin copolymer are more preferred.

The content of the softener is preferably 0 to 200 parts by weight, more preferably 0 to 100 parts by weight, and particularly preferably 0 to 50 parts by weight, based on 100 parts by weight of the polyolefin component in component (A). When the content of the softener exceeds 200 parts by weight, poor dispersion occurs in some cases at the time of kneading with the rubber components.

Component (B): Polyolefin Resin

As component (B) of the invention, an $\alpha$-olefin crystalline thermoplastic resin and/or an $\alpha$-olefin amorphous thermoplastic resin can be used. These may be used either alone or as a combination of two or more thereof, and the crystalline and amorphous resins may be used in combination thereof.

The $\alpha$-olefin crystalline thermoplastic resin is not particularly limited as long as it is a crystalline resin containing an $\alpha$-olefin as a main monomer component, and may be either a homopolymer of an $\alpha$-olefin or a copolymer of an $\alpha$-olefin with another monomer. Further, it may be a mixture of two or more kinds of these different homopolymers and/or copolymers. The $\alpha$-olefin crystalline thermoplastic resin is preferably one containing an $\alpha$-olefin in an amount of 80 mol % or more (preferably 90 mol % or more) based on the entire monomer-constituting units. The above-mentioned $\alpha$-olefins include, for example, $\alpha$-olefins having 2 to 12 carbon atoms such as ethylene, propene (propylene), 1-butene, 1-pentene, 3-methyl-1-butene, 1-hexene, 3-methyl-1-pentene, 4-methyl-1-pentene, 3-ethyl-1-pentene, 1-octene, 1-decene and 1-undecene. These can be used alone or in combination thereof.

In the case where the α-olefin crystalline thermoplastic resin is a copolymer, this copolymer may be either a random copolymer or a block copolymer. In the random copolymer, in order to have crystallinity, the total content of constituent units except for the α-olefin is preferably 15 mol % or less (more preferably 10 mol % or less), when the entire random copolymer is taken as 100 mol %. On the other hand, in the block copolymer, the total amount of constituent units except for the α-olefin is preferably 40 mol % or less (more preferably 20 mol % or less), when the entire block copolymer is taken as 100 mol %.

On the other hand, the α-olefin amorphous thermoplastic resin is not particularly limited as long as it is an amorphous resin containing an α-olefin as a main monomer component, and may be either a homopolymer of an α-olefin or a copolymer of an α-olefin with another monomer. Further, it may be a mixture of two or more kinds of these different homopolymers and/or copolymers. The α-olefin amorphous thermoplastic resin is preferably one containing an α-olefin in an amount of 50 mol % or more (more preferably 60 mol % or more) based on the entire monomer-constituting units. As the α-olefin which constitutes the α-olefin amorphous thermoplastic resin, an α-olefin having 3 or more carbon atoms is preferably used, and an α-olefin having 3 to 12 carbon atoms similar to those exemplified in the above-mentioned α-olefin crystalline thermoplastic resin is preferably used.

Examples of the α-olefin amorphous thermoplastic resins include homopolymers such as atactic polypropylene and atactic poly-1-butene, copolymers of propylene (contained in an amount of 50 mol % or more) with other α-olefins (such as ethylene, 1-butene, 1-pentene, 1-hexene, 4-methyl-1-pentene, 1-octene and 1-decene), copolymers of 1-butene (contained in an amount of 50 mol % or more) with other α-olefins (such as ethylene, propylene, 1-pentene, 1-hexene, 4-methyl-1-pentene, 1-octene and 1-decene). Incidentally, the above-mentioned copolymer may be either a random copolymer or a block copolymer. However, in the case of the block copolymer, an α-olefin unit to be a main component (propylene or 1-butene in the above-mentioned copolymer) is required to be bonded in an atactic structure. Further, when the above-mentioned α-olefin amorphous thermoplastic resin is a copolymer of an α-olefin having 3 or more carbon atoms with ethylene, the content of the α-olefin is preferably 50 mol % or more (more preferably from 60 to 100 mol %), taking the entire copolymer as 100 mol %.

Although the melt tension of component (B) of the invention at a temperature of 210° C. and at a take-up speed of 2.0 m/min is not particularly limited, it is preferably 3.0 cN or more (for example, about 3.0 to 50 cN), more preferably 5.0 cN or more (for example, about 5.0 to 50 cN) and still more preferably 8.0 cN or more (for example, about 8.0 to 50 cN). When the melt tension of component (B) is less than 3.0 cN, the expansion ratio is low in the case where polyolefin resin composition is foamed, so that closed cells are difficult to be formed, and the shape of cells formed becomes difficult to be made uniform. Accordingly, in order to obtain a foam having high expansion ratio, highly closed cells and a uniform foamed cell shape, the melt tension of the component (B) is preferably 3.0 cN or more.

The amount of component (B) of the invention used is preferably 10 to 200 parts by weight, and more preferably 20 to 100 parts by weight, based on 100 parts by weight of the above-mentioned component (A). When the amount of component (B) is less than 10 parts by weight based on 100 parts by weight of component (A), gas easily leaks at the time of foaming, so that it is difficult to obtain a foam having high expansion ratio. On the other hand, exceeding 200 parts by weight results in easy deterioration of cushioning properties.

When the polyolefin resin composition of the invention is prepared, the shape of components (A) and (B) is not particularly limited. They may have any of a pellet shape, a powdery shape or the like.

Component (C): At Least One Aliphatic Compound Selected from Aliphatic Acid, Aliphatic Acid Amide and Aliphatic Acid Metallic Soap, Which has Polar Functional Group and has Melting Point of 50 to 150° C.

The polyolefin resin composition forming the polyolefin resin foam of the invention contains as component (C) at least one aliphatic compound selected from an aliphatic acid, an aliphatic acid amide and an aliphatic acid metallic soap, which has a polar functional group and has a melting point of 50 to 150° C.

Component (C) of the invention is the aliphatic compound having a polar functional group such as a carboxyl group, a metal salt thereof or an amido group, and specifically, it is, for example, at least one selected from an aliphatic acid, an aliphatic acid amide and an aliphatic acid metallic soap. Of these, since one having a high polar functional group is hard to be compatible with the polyolefin resin, it is easily precipitated on a surface of the resin to easily exert the effects of the invention. As such compounds, the aliphatic acid and the aliphatic acid amide are particularly preferably exemplified. The aliphatic acid amide is preferably an aliphatic acid amide in which an aliphatic acid has about 18 to 38 carbon atoms (more preferably 18 to 22 carbon atoms), and may be either a monoamide or a bisamide. Specific examples thereof include stearic acid amide, oleic acid amide, erucamide, methylenebisstearic acid amide, ethylenebisstearic acid amide. Of these, erucamide is particularly preferably exemplified. Further, the aliphatic acid is preferably one having about 18 to 38 carbon atoms (more preferably 18 to 22 carbon atoms), and specific examples thereof include stearic acid, behenic acid, 12-hydroxystearic acid. Of these, behenic acid is particularly preferred. Examples of the aliphatic acid metallic soaps include aluminum, calcium, magnesium, lithium, barium, zinc and lead salts of the above-mentioned aliphatic acids.

Since component (C) of the invention (particularly, the aliphatic acid or the aliphatic acid amide) has high crystallinity, when added to the polyolefin resin, it forms a strong film on the surface of the resin. When the resin foam is subjected to punching processing, this is thought to act so as to prevent blocking of resin walls which form cells. The cells of the resin foam become difficult to collapse, and shape recovery is improved.

The content of component (C) of the invention is 1 to 5 parts by weight, preferably 1.5 to 3.5 parts by weight, and more preferably 2 to 3 parts by weight, based on 100 parts by weight of the total amount of component (A) and component (B). When the content of component (C) is less than 1 part by weight, component (C) is not precipitated in a sufficient amount on the surface of the resin, resulting in failure to obtain the effect of improving punching processability. On the other hand, when it exceeds 5 parts by weight, the resin is plasticized to fail to keep sufficient pressure in an extruder, which causes a decrease in the content of a blowing agent such as carbon dioxide in the resin to fail to obtain high expansion ratio, resulting in failure to obtain a foam having sufficient foam density.

The melting point of component (C) of the invention is 50 to 150° C., and preferably 70 to 100° C., from the viewpoints of lowering molding temperature, inhibiting deterioration of the polyolefin resin composition, imparting sublimation resistance, and the like.

Flame Retardant

The resin foam of the invention has a disadvantage of being flammable, because it is composed of a thermoplastic polymer. For that reason, particularly in applications in which impartation of flame retardance is indispensable, such as electronic device applications, it is desirable to incorporate various flame retardants. As the flame retardants used in the invention, there can be used flame retardants which have hitherto been commonly used. Chlorine-based or bromine-based flame retardants have a problem of generating poisonous gases at the time of burning. Further, phosphorous or antimony-based flame retardants also have a problem of harmful effect or explosiveness. Accordingly, as the flame retardant in the invention, a non-halogen-non-antimony-based metal hydroxide compound is preferably added as an inorganic flame retardant. As such flame retardants, there are preferably used aluminum hydroxide, magnesium hydroxide, a hydrate of magnesium oxide-nickel oxide, a hydrate of magnesium oxide-zinc oxide, and the like. Particularly preferred is magnesium hydroxide. The above-mentioned hydrated metal compounds may be surface treated. These flame retardants can be used either alone or as a mixture of two or more thereof.

The content of the above-mentioned flame retardant is preferably 5 to 70% by weight, and more preferably 25 to 65% by weight, based on the entire polyolefin resin composition. When the content of the flame retardant is excessively small, the flame-retarding effect is reduced. On the other hand, when it is excessively large, it becomes difficult to obtain the highly foamed resin foam.

Nucleant Agent

It is preferred that the polyolefin resin composition in the invention contains a nucleant agent. As the nucleant agent, there can be used an oxide, a composite oxide, a metal carbonate, a metal sulfate, a metal hydroxide and the like, such as talc, silica, alumina, mica, titania, zinc oxide, zeolite, calcium carbonate, magnesium carbonate, barium sulfate and aluminum hydroxide. The cell diameter of the foam can be easily controlled by allowing these nucleant agents to be contained, thereby being able to obtain the foam having appropriate flexibility and excellent in cutting processability.

The average particle diameter of the nucleant agent of the invention is preferably 0.1 μm to 2.0 μm, more preferably 0.3 μm to 1.5 μm, and particularly preferably 0.4 μm to 1.2 μm. When the average particle diameter of the nucleant agent is within the above-mentioned range, extremely fine cells can be formed after foaming to improve shape recovery at the time of punching processing. This is therefore preferred. When the average particle diameter is less than 0.1 μm, the function as a nucleant agent becomes insufficient to fail to obtain a foam having a preferred cell diameter in some cases. On the other hand, when the average particle diameter is 2.0 mm or more, cell walls are broken by the nucleant agent to fail to obtain high expansion ratio in some cases. Incidentally, the above-mentioned average particle diameter can be measured, for example, by a laser diffraction type particle size distribution measuring method. For example, it can be measured (automatic measurement mode) from a dispersed diluted solution of a sample by "MICROTRACT MT-3000" manufactured by Leeds & Northrup Instruments Inc.

The amount of the nucleant agent of the invention used is preferably 0.5 to 150 parts by weight, more preferably 2 to 140 parts by weight, and particularly preferably 3 to 130 parts by weight, based on 100 parts by weight of the total amount of component (A) and component (B). When the amount of the nucleant agent used is less than 0.5 part by weight, it is difficult to obtain a sufficient effect thereof. When it exceeds 150 parts by weight, foaming is liable to be inhibited. The nucleant agent can be added to a molding machine as a master batch, using a polyolefin resin or the like. Incidentally, the nucleant agent may be added in the preparation of the thermoplastic elastomer composition according to the necessity.

Other Additives

The polyolefin resin composition of the invention can contain various additives in addition to the above according to the necessity. Examples of such additives include a blowing agent, a lubricant, an antioxidant, a thermal stabilizer, a light resisting agent such as HALS, a weathering agent, a metal inactivator, a UV absorber, a light stabilizer, a stabilizer such as a copper-induced degradation inhibiting agent, a filler, a reinforcing agent, an antistatic agent, an antibacterial agent, an antifungal agent, a dispersant, a plasticizer, a tackifier, carbon black, a colorant such as an organic pigment, an isobutylene-isoprene copolymer, a rubber such as a silicone rubber, an ethylene-vinyl acetate copolymer, a thermoplastic resin such as an ABS resin.

Incidentally, these additives may be added in the preparation of component (A) according to the necessity.

The above-mentioned lubricant has the functions of improving fluidity of the thermoplastic polymer and inhibiting thermal degradation of the polymer. The lubricant used in the invention is not particularly limited as long as it is one exerting the effect of improving fluidity of the thermoplastic polymer, and examples thereof include hydrocarbon-based lubricants such as liquid paraffin, paraffin wax, microcrystalline wax and polyethylene wax; ester-based lubricants such as butyl stearate, stearic acid monoglyceride, pentaerythritol tetrastearate, hydrogenated castor oil and stearyl stearate.

Polyolefin Resin Composition

The polyolefin resin composition of the invention can be prepared by mixing the above-mentioned components (A), (B) and (C), the nucleant agent, the flame retardant and the other additives by using a commonly used melt-kneading device such as an open-type mixing roll, a closed-type Banbury mixer, a single-screw extruder, a twin-screw extruder, a continuous kneader or a pressurizing kneader.

Polyolefin Resin Foam

The polyolefin resin foam of the invention is obtained by foaming the polyolefin resin composition containing at least the above-mentioned components (A), (B) and (C) by using a blowing agent. As the blowing agent used in the invention, there can be used one generally used for foam molding of a polyolefin resin, and it is not particularly limited. However, from the viewpoints of environmental protection and low contamination to a body to be foamed, it is preferred to use a high-pressure inert gas.

The inert gas used in the invention is not particularly limited as long as it is inert to and can impregnate into the above-mentioned components (A) to (C) and the like, and examples thereof include carbon dioxide, nitrogen gas, air. These gases may be used as a mixture thereof. Of these, carbon dioxide is particularly preferred from the viewpoints of its high impregnation amount in the polyolefin resin used as a material for the foam and high impregnation speed.

Further, the inert gas is preferably in a supercritical state when impregnated into the polyolefin resin composition. Namely, the case where carbon dioxide in the supercritical state is used is most preferred. In the supercritical state, the solubility in the resin more increases to make it possible to be mixed at a high concentration, and the occurrence of cell nuclei increases because of the high concentration upon a rapid pressure drop to increase the density of cells formed by growth of the cell nuclei compared with the case in another state even at the same porosity. Accordingly, the fine cells can be obtained. Incidentally, the critical temperature of carbon dioxide is 31° C., and the critical pressure thereof is 7.4 MPa.

Methods for producing the foam by impregnating the polyolefin resin composition with the high-pressure inert gas include, specifically, a method including a gas impregnation step of impregnating the polyolefin resin composition with the inert gas under high pressure, a pressure reduction step of reducing the pressure after the above step to foam the resin, and a heating step of allowing the cells to grow by heating according to the necessity. In this case, as described above, an unfoamed molded product previously molded may be impregnated with the inert gas, or the polyolefin resin composition melted may be impregnated with the inert gas in a pressurized state, and then, molded upon the pressure drop. These steps may be performed by either system of a batch system or a continuous system.

An example of a method for producing the polyolefin resin foam by the batch system will be shown below. First, the above-mentioned polyolefin resin composition is extruded by using an extruder such as a single-screw extruder or a twin-screw extruder, thereby forming a resin sheet for molding a foam. Alternatively, the above-mentioned polyolefin resin composition is homogeneously kneaded by using a kneader provided with blades, such as a roller, cum, kneader or Banbury type kneader, and pressed to a predetermined thickness by using a hot-plate press or the like, thereby preparing a resin sheet for molding a foam. The resin sheet for molding a foam thus obtained (unfoamed sheet) is placed in a high-pressure vessel, and the high-pressure inert gas (such as carbon dioxide in the supercritical state) is injected thereinto to impregnate carbon dioxide into the above-mentioned unfoamed sheet. At a time when carbon dioxide is sufficiently impregnated thereinto, pressure is released (usually up to atmospheric pressure) to generate cell nuclei in the resin constituting the sheet. Although the cell nuclei may be allowed to grow as such at room temperature, they may be allowed to grow by heating in some cases. As heating means, there can be employed well-known or commonly used means such as a water bath, an oil bath, a hot roll, a hot-air oven, far-infrared irradiation, near-infrared irradiation and microwave irradiation. After the cells are allowed to grow as described above, they are rapidly cooled with cold water or the like to fix their shape, thereby being able to obtain the polyolefin resin foam. Incidentally, the molded product to be subjected to foaming is not limited to the sheet-shaped product, and products having various shapes can be used depending upon their use. Further, the molded product to be subjected to foaming can also be prepared by, in addition to extrusion molding and press molding, other molding methods such as injection molding.

Next, an example of a method for producing the polyolefin resin foam by the continuous system will be shown below. With kneading the above-mentioned polyolefin resin composition by using an extruder such as a single-screw extruder or a twin-screw extruder, the high-pressure inert gas is injected thereinto. After the inert gas is sufficiently impregnated into the resin, the resin is extruded to release pressure (usually up to atmospheric pressure) to allow cell nuclei to grow, by heating in some cases. After the cells are allowed to grow, they are rapidly cooled with cold water or the like to fix their shape, thereby being able to obtain the polyolefin resin foam. Incidentally, the foam molding can be performed by using, in addition to an extruder, an injection molding machine or the like. The shape of the foam is not particularly limited, and may be any of sheet, prism, cylinder and heteromorphic forms.

The pressure at the time when the above-mentioned inert gas is impregnated into the resin can be suitably selected in consideration of operability and the like, and it is, for example, 6 MPa or more (for example, about 6 to 100 MPa), and preferably 8 MPa or more (for example, about 8 to 50 MPa). Incidentally, the pressure at the time when carbon dioxide in the supercritical state is used is 7.4 MPa or more, from the viewpoint of keeping the supercritical state of carbon dioxide. When the pressure is lower than 6 MPa, since the cell growth at the time of foaming is remarkable, the cell diameter becomes too large to obtain the preferred average cell diameter in some cases. This is because the impregnation amount of the gas under low pressure is relatively small as compared with that under high pressure and the cell nucleant-forming rate is lowered to decrease the number of cell nuclei formed, which causes contrarily an increase in the amount of the gas per cell to extremely increase the cell diameter. Moreover, in the pressure region of lower than 6 MPa, the cell diameter and cell density remarkably change only by a slight change in the impregnation pressure, so that it is liable to become difficult to control the cell diameter and cell density.

The temperature in the gas impregnation step varies depending on the kind of inert gas and components (A) and (B) and the like, and can be selected from the wide range. However, in the case of considering operability and the like, it is, for example, about 10 to about 350° C. For example, when an unfoamed molded product having a sheet shape or the like is impregnated with the inert gas, the impregnation temperature is about 10 to about 200° C., and preferably about 40 to about 200° C., in the batch system. Further, when a melted polymer impregnated with the gas is extruded to simultaneously perform foaming and molding, the impregnation temperature is generally from about 60 to about 350° C., in the continuous system. Incidentally, when carbon dioxide is used as the inert gas, the temperature at the time of impregnation is preferably 32° C. or more, and particularly preferably 40° C. or more, in order to keep the supercritical state.

In the above-mentioned pressure reduction step, the pressure reduction rate is not particularly limited. However, in order to obtain homogeneous fine cells, it is preferably about 5 to about 300 MPa/sec. Further, the heating temperature in the above-mentioned heating step is, for example, about 40 to about 250° C., and preferably about 60 to about 250° C.

The average cell diameter of the polyolefin resin foam of the invention is preferably 50 to 250 μm, and more preferably 80 to 150 μm. When the average cell diameter is less than 50 μm, sufficient cushioning properties (impact resistance) are not obtained in some cases. When it exceeds 250 μm, shape recovery at the time of punching processing decreases, or it becomes difficult to decrease the thickness of the foam, in some cases.

In order to make the foam thin and small, it becomes necessary to decrease the average cell diameter. In general, as the foam has fine cells having a smaller average cell diameter, cell walls are liable to come in contact with one another, and the cells are liable to be left collapsed at the time of cutting, resulting in a decrease in processability. In the polyolefin resin foam of the invention, blocking of the cell walls is difficult to occur by addition of the specific amount of component (C), so that the cells are difficult to be left collapsed at the time of punching processing to show excellent shape recovery even when the average cell diameter is decreased. Further, the extremely fine cells can be formed, and furthermore, there is no breakage of the cell walls by the nucleant agent, by controlling the particle diameter of the nucleant agent to the specific size and using carbon dioxide in the supercritical state as the blowing agent. Accordingly, the cells in the punching site are difficult to collapse to improve shape recovery at the time of processing.

The load against repulsion upon compressing to 50% of the polyolefin resin foam of the invention is preferably 0.1 to 3.0 N/cm$^2$, and more preferably 0.1 to 2.0 N/cm$^2$, from the viewpoint of impact resistance.

The polyolefin resin foam of the invention has high expansion ratio, highly closed cells, a uniform foamed cell shape, excellent flexibility and cushioning properties, and an excellent surface appearance. The density of the polyolefin resin foam is, for example, preferably 0.2 g/cm$^3$ or less (about 0.01 to about 0.2 g/cm$^3$), more preferably 0.02 to 0.15 g/cm$^3$, and still more preferably within the range of 0.03 to 0.12 g/cm$^3$.

The above-mentioned average cell diameter, the load against repulsion upon compressing to 50% and density of the foam can be adjusted depending on the kind of inert gas and components (A) to (C) and the particle diameter of the nucleant agent, for example, by suitably selecting and setting operating conditions such as the temperature, pressure and time in the gas impregnation step, operating conditions such as the pressure reduction rate, temperature and pressure in the pressure reduction step, the heating temperature after pressure reduction, and the like.

The shape and size of the polyolefin resin foam of the invention are not particularly limited. However, the foam is particularly useful as a sheet-shaped foam, because of being excellent in cutting processability as described above. When the polyolefin resin foam of the invention is sheet-shaped, the thickness thereof can be selected, for example, from the wide range of 0.1 to 5.0 mm. In particular, even when the foam is a thin sheet-shaped foam having a thickness of about 0.2 to about 3.0 mm, it can be suitably used as a foamed sheet excellent in processability.

The polyolefin resin foam of the invention can be utilized, for example, as internal insulators of electronic devices and information devices, cushioning materials, dust proofing materials (seal materials), sound insulating materials, heat insulating materials, food packing materials, clothing materials, building materials, interior parts or exterior parts of automobiles and home electric appliances, and the like. Above all, it is preferably used for applications requiring a foam having fine cells with a relatively small cell diameter, and particularly preferably used as seal materials for fixing image display members (such as liquid crystal displays and electroluminescence displays) in electronic devices such as cellular telephones and electronic terminals, and optical members (such as cameras and lenses).

Measurement Methods of Physical Properties and Evaluation Method of Effect

Measurement methods and an evaluation method of an effect used in this application will be exemplified below.

(1) Foam Density

The sheet-shaped foam was punched to a size of 100 mm×100 mm to form a test piece. After the size of the test piece was measured by using a slide caliper, the mass thereof was measured with an electric balance, and the density was determined according to the following equation:

Foam density (g/cm$^3$)=mass of test piece (g)/volume of test piece (cm$^3$)

(2) Cutting Processability

Figure 2:
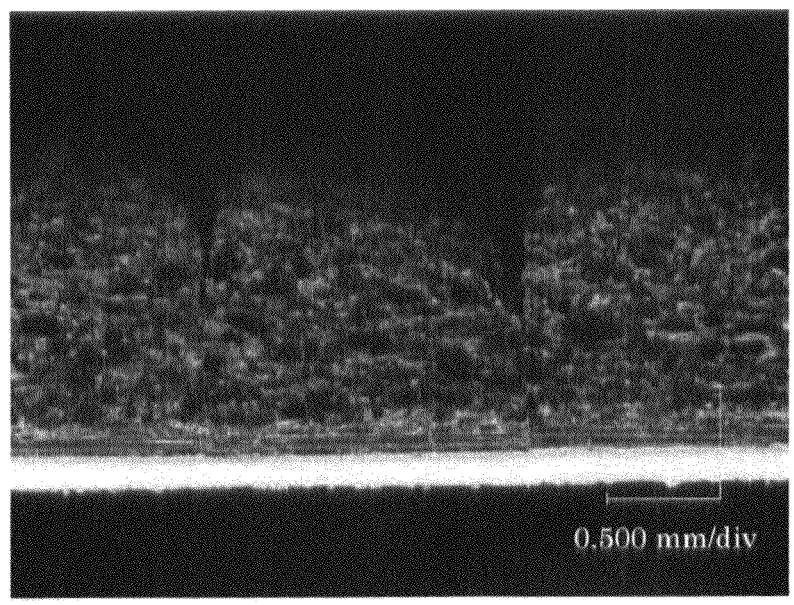
FIG. 2 is a digital microscopic photograph showing a state of a foam after punching in the case where evaluation is "B" in an evaluation test of cutting processability in Examples.

The sheet-shaped foam (70 mm×220 mm in size) was placed on a plate made of polypropylene, and then, two processing blades (trade name: "NCA07", thickness: 0.7 mm, blade tip angle: 43°, manufacture by Nakayama Co., Ltd.) between which a 1.8 mm spacer was put were pushed thereinto to punch out (cut) the foam. The cut width was set at 2.5 mm. Two hours after punching, the foam was observed visually and under a digital microscope. One in which collapse in the punching site of the foam was small (there was scarcely a difference in thickness between the punching site (end part) of the foam and the other sites) was evaluated as "A" (see FIG. 1), and one in which collapse in the punching site (end part) of the foam was large (the upper end part of the punching site of the foam looked round, and there was a large difference in thickness between the punching site and the other sites) was evaluated as "B" (see FIG. 2).

(3) Average Cell Diameter

An enlarged image of a cell portion of the foam was scanned by a digital microscope (trade name: "VH-8000" manufactured by Keyence Corporation), and image analysis was performed by using an image analysis software (trade name: "Win ROOF" manufactured by Mitani Corporation), thereby determining the average cell diameter (μm).

EXAMPLE

The invention will be described below in more detail with reference to examples. However, the invention is not limited by these examples in any way. Incidentally, "parts" and "%" are on the weight basis, unless otherwise specified.

Example 1

Fifty-five parts of a thermoplastic elastomer composition (a blend (TPO) of polypropylene (PP) and ethylene/propylene/5-ethylidene-2-norbornene ternary copolymer (EPT) (containing 16.7% by weight of carbon black)), 45 parts of polypropylene, 10 parts of a lubricant (a master batch obtained by blending 10 parts of polyethylene with 1 part of stearic acid monoglyceride), 10 parts of a nucleant agent (magnesium hydroxide) and 3 parts of erucamide were kneaded by a twin-screw extruder at a temperature of 200° C., and then, extruded in strand form. After water cooling, the extruded product was cut in pellet form and molded. The pellets were placed into a single-screw extruder, and carbon dioxide was injected thereinto in an atmosphere of 220° C. under a pressure of 14 MPa (after injection: 18 MPa). After sufficient saturation with carbon dioxide, the pellets were extruded through a die to obtain a sheet-shaped foam (thickness: 2.0 mm).

Example 2

Fifty-five parts of a thermoplastic elastomer composition (the same as in Example 1), 45 parts of polypropylene (the same as in Example 1), 10 parts of a lubricant (the same as in Example 1), 10 parts of a nucleant agent (the same as in Example 1) and 3 parts of behenic acid were kneaded by a twin-screw extruder at a temperature of 200° C., and then, extruded in strand form. After water cooling, the extruded product was cut in pellet form and molded. The pellets were placed into a single-screw extruder, and carbon dioxide was injected thereinto in an atmosphere of 220° C. under a pressure of 14 MPa (after injection: 18 MPa). After sufficient saturation with carbon dioxide, the pellets were extruded through a die to obtain a sheet-shaped foam (thickness: 2.0 mm).

Comparative Example 1

Fifty-five parts of a thermoplastic elastomer composition (the same as in Example 1), 45 parts of polypropylene (the same as in Example 1), 10 parts of a lubricant (the same as in Example 1) and 10 parts of a nucleant agent (the same as in Example 1) were kneaded by a twin-screw extruder at a temperature of 200° C., and then, extruded in strand form. After water cooling, the extruded product was cut in pellet form and molded. The pellets were placed into a single-screw extruder, and carbon dioxide was injected thereinto in an atmosphere of 220° C. under a pressure of 14 MPa (after injection: 18 MPa). After sufficient saturation with carbon dioxide, the pellets were extruded through a die to obtain a sheet-shaped foam (thickness: 2.0 mm).

TABLE 1

|  | Example 1 | Example 2 | Comparative Example 1 |
|---|---|---|---|
| Foam Density [g/cm³] | 0.034 | 0.037 | 0.037 |
| Cell Diameter [μm] | 96 | 107 | 97 |
| Cutting Processability | A | A | B |

From Table 1, it is seen the Examples 1 and 2 have excellent cutting processability. On the other hand, it is seen that comparative Example 1 is poor in cutting processability.

While the invention has been described in detail with reference to specific embodiments thereof, it will be apparent to one skilled in the art that various changes and modifications can be made therein without departing from the spirit and scope of the invention.

The present application is based on Japanese Patent Application No. 2006-270319 filed on Oct. 2, 2006, the entire contents thereof being incorporated herein by reference.

Further, all references cited herein are incorporated in their entirety.

INDUSTRIAL APPLICABILITY

The polyolefin resin foam of the invention is excellent in flexibility and cushioning properties, and also excellent in processability. In particular, even when the expansion ratio is high, the cells in the punching site are difficult to collapse at the time of punching processing to have excellent shape recovery. For this reason, the processing width can be extremely narrowed, and it becomes possible to widen the range of selection of the thickness.

The invention claimed is:

1. A polyolefin resin foam which comprises a polyolefin resin composition comprising:
   (A) a rubber and/or a thermoplastic elastomer;
   (B) a polyolefin resin; and
   (C) at least one aliphatic compound selected from an aliphatic acid, an aliphatic acid amide and an aliphatic acid metallic soap, said compound having a polar functional group and having a melting point of 50 to 150° C.,
   wherein a content of the aliphatic compound is 1 to 5 parts by weight based on 100 parts by weight of the total amount of the rubber and/or thermoplastic elastomer and the polyolefin resin.

2. The polyolefin resin foam according to claim 1, wherein the aliphatic compound is an aliphatic acid or an aliphatic acid amide.

3. The polyolefin resin foam according to claim 2, wherein the aliphatic acid amide is erucamide.

4. The polyolefin resin foam according to claim 2, wherein the aliphatic acid is behenic acid.

5. The polyolefin resin foam according to claim 1, wherein the polyolefin resin has a melt tension of 3.0 cN or more at a temperature of 210° C. and at a take-up speed of 2.0 m/min.

6. The polyolefin resin foam according to claim 1, wherein the rubber and/or thermoplastic elastomer is/are a non-crosslinked type thermoplastic olefin elastomer.

7. The polyolefin resin foam according to claim 1, having an average cell diameter of 50 to 250 μm.

8. The polyolefin resin foam according to claim 1, which is obtained by foaming the polyolefin resin composition further comprising a nucleant agent having an average particle diameter of 0.1 μm to less than 2.0 μm, using carbon dioxide in a supercritical state.

9. The polyolefin resin foam according to claim 1, having a density of 0.2 g/cm³ or less.

10. A process for producing a polyolefin resin foam, said process comprising foaming a polyolefin resin composition using carbon dioxide in a supercritical state,
   wherein the polyolefin resin composition comprising:
   (A) a rubber and/or a thermoplastic elastomer;
   (B) a polyolefin resin;
   (C) at least one aliphatic compound selected from an aliphatic acid, an aliphatic acid amide and an aliphatic acid metallic soap, said compound having a polar functional group and having a melting point of 50 to 150° C., and
   (D) a nucleant agent having an average particle diameter of 0.1 μm to less than 2.0 μm,
   wherein a content of the aliphatic compound is 1 to 5 parts by weight based on 100 parts by weight of the total amount of the rubber and/or thermoplastic elastomer and the polyolefin resin.

* * * * *